United States Patent
Rottinghuis et al.

(10) Patent No.: US 11,349,846 B2
(45) Date of Patent: May 31, 2022

(54) MANAGING USER IDENTITIES IN A MANAGED MULTI-TENANT SERVICE

(71) Applicant: Twitter, Inc., San Francisco, CA (US)

(72) Inventors: Joep Rottinghuis, Redwood City, CA (US); Vrushali Channapattan, Santa Clara, CA (US)

(73) Assignee: Twitter, Inc., San Francisco, CA (US)

( * ) Notice: Subject to any disclaimer, the term of this patent is extended or adjusted under 35 U.S.C. 154(b) by 1 day.

(21) Appl. No.: 16/845,000

(22) Filed: Apr. 9, 2020

(65) Prior Publication Data
US 2020/0329049 A1 Oct. 15, 2020

Related U.S. Application Data

(60) Provisional application No. 62/831,659, filed on Apr. 9, 2019.

(51) Int. Cl.
*G06F 15/16* (2006.01)
*H04L 9/40* (2022.01)
*H04L 67/1097* (2022.01)

(52) U.S. Cl.
CPC ........ *H04L 63/102* (2013.01); *H04L 63/0823* (2013.01); *H04L 63/0884* (2013.01); *H04L 63/101* (2013.01); *H04L 67/1097* (2013.01)

(58) Field of Classification Search
CPC . H04L 63/101; H04L 63/102; H04L 63/0823; H04L 63/0884; H04L 63/1097
See application file for complete search history.

(56) References Cited

U.S. PATENT DOCUMENTS

| 8,010,810 B1 * | 8/2011 | Fitzgerald | H04L 9/0894 713/193 |
| 2014/0280948 A1 | 9/2014 | Schmidt et al. | |
| 2015/0180877 A1 * | 6/2015 | Liu | H04L 63/101 726/4 |
| 2018/0077138 A1 | 3/2018 | Bansal et al. | |
| 2019/0278938 A1 * | 9/2019 | Greene | G06F 9/5072 |

OTHER PUBLICATIONS

Kuntz et al., "OmniCloud—The Secure and Flexible Use of Cloud Storage Services," Sep. 2014, Fraunhofer SIT, 30 pages.
PCT International Search Report and Written Opinion in International Application No. PCT/US2020/027558, 17 pages.

\* cited by examiner

*Primary Examiner* — Yves Dalencourt
(74) *Attorney, Agent, or Firm* — Fish & Richardson P.C.

(57) ABSTRACT

Methods, systems, and apparatus, including computer programs encoded on computer storage media, for processing data in a multi-tenant system. One of the methods includes receiving a data processing job associated with a user account of a user; determining to launch the data processing job on one or more cloud clusters of a cloud services provider; identifying a mirror account corresponding to the user, wherein the mirror account defines which cloud resources of the cloud services provider the user is permitted to access; obtaining a key for the mirror account; sending a request to launch the data processing job on the one or more cloud clusters, comprising sending data characterizing the data processing job, the mirror account of the user, and the obtained key to the one or more cloud clusters; and receiving output data associated with the data processing job from the one or more cloud clusters.

24 Claims, 4 Drawing Sheets

MANAGING USER IDENTITIES IN A MANAGED MULTI-TENANT SERVICE

CROSS-REFERENCE TO RELATED APPLICATION

This application claims the benefit under 35 U.S.C. § 119(e) of the filing date of U.S. Patent Application No. 62/831,659, which was filed on Apr. 9, 2019, and which is incorporated here by reference.

BACKGROUND

This specification relates to user identities in data processing in a multi-tenant environment.

In a conventional multi-tenant on-premises only model, multiple users, e.g., of an enterprise, perform ad-hoc processing on clusters within the enterprise network, for example, at one or more data centers of the enterprise. Typically, the same user credentials are used for both user access to enterprise services and access to clusters.

In a conventional multi-tenant cloud only model, a third party cloud provider hosts clusters that can be used to perform processing. Some enterprises using a cloud for data processing rely on a single service account to run all data processing jobs. Thus, regardless of the individual user account initiating the job at the enterprise, the cloud data accesses are all associated with the same service account.

These third party cloud providers may also provide other services, for example, e-mail, calendaring, and various software-as-a-service applications.

SUMMARY

This specification describes technologies for managing identities in a multi-tenant environment where tasks are executed on behalf of a user in a non-interactive environment, e.g., in a hybrid on-premises and cloud architecture. The hybrid architecture includes on-premises clusters and cloud clusters for data processing. In addition, the cloud can provide other services, e.g., e-mail and other cloud-based applications. When the user is present, an authentication token, e.g., a kerberos "delegation token," is normally used. However, when un-attended tasks are launched on a cloud cluster on a users' behalf, and these tasks require access to a second system, it is important to avoid also providing access to other systems such as the other cloud services. Using techniques described in this specification, user data processing jobs on the cloud clusters can be performed using a mirror account generated for each user, where the mirror account mirrors an enterprise account of the user. The mirror account can be transparent to the user while providing authorization, authentication, and auditing for cloud data processing jobs.

The subject matter described in this specification can be implemented in particular embodiments so as to realize one or more of the following advantages. A mirror account can be associated with respective user enterprise accounts for use with data processing jobs performed on cloud clusters of a multi-service cloud environment. This can provide authorization, authentication, and auditing of data accesses on the cloud clusters without risk of revealing user data for other services provided by the cloud. The mirror accounts, in contrast with a single service account for all users, can each be tailored with specific credentials for data access. Furthermore, the unique mirror accounts for each user allow for simple auditing of data accesses that is more difficult with a single super-user service account acting on behalf of the user. The mirror account creation and use can be transparent to the users so that users do not need to learn another username and password to perform cloud based data processing tasks. With the use of a mirror account, a potential compromise of user credentials is limited to access of only one service for a short period of time, and does not expose access to other services.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
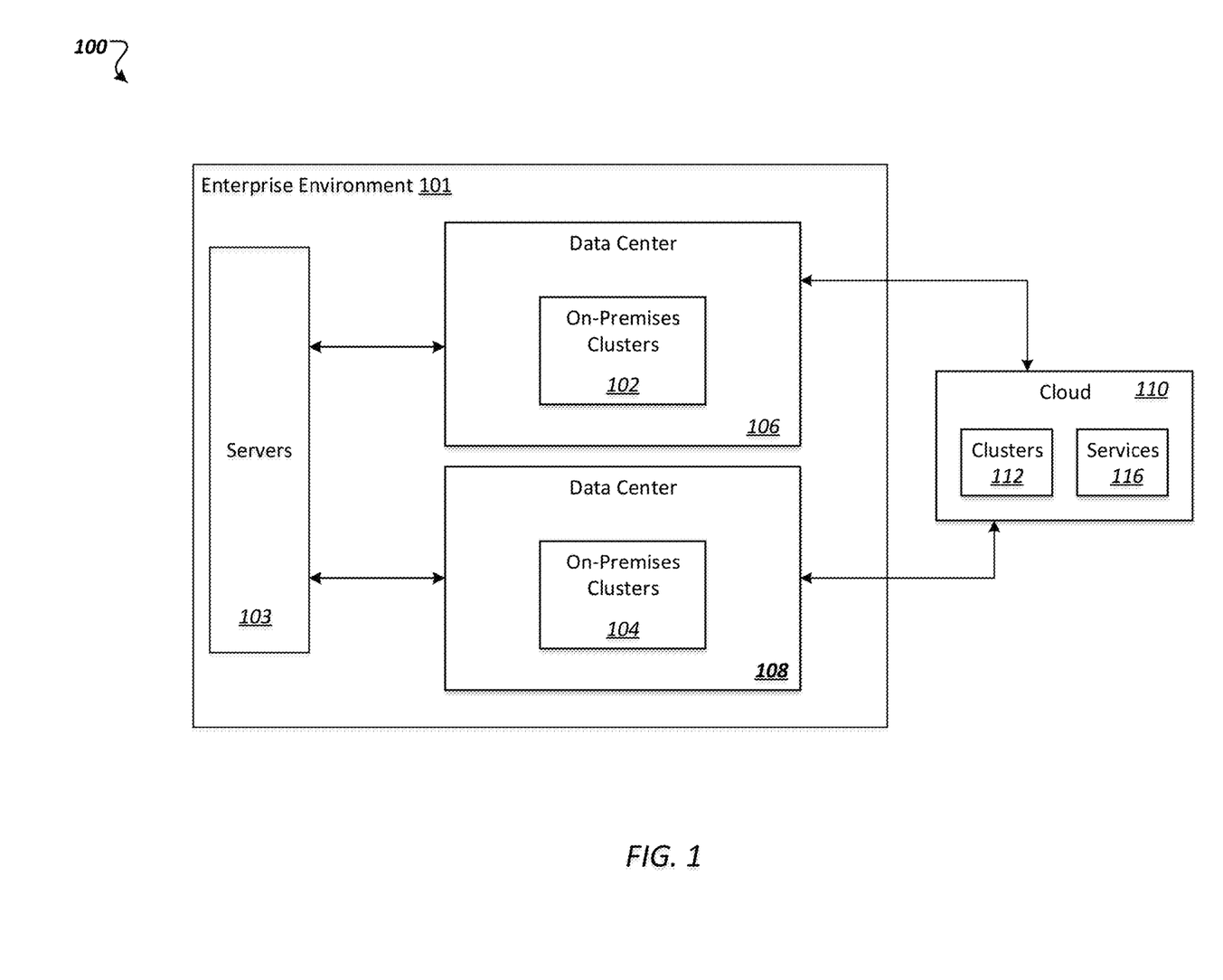
FIG. 1 is a block diagram of an example hybrid on-premises and cloud architecture.

FIG. 1 is a block diagram of an example hybrid on-premises and cloud architecture 100. In the hybrid on-premises and cloud architecture 100, some portion of the data processing of an enterprise happens on on-premises clusters 102 and 104 located in data centers 106 and 108, respectively, of an enterprise environment 101. Additionally, some other portion of the data processing of the enterprise occurs on cloud clusters 112 located on a cloud environment 110.

The clusters 102, 104, and 112 can be computational clusters of many computing devices used to process large data sets in a distributed environment. In some implementations, one or more of the clusters are Hadoop clusters.

Additionally, the enterprise environment 101 includes enterprise servers 103 through which users can access the clusters of the data centers or cloud. Thus, the architecture 100 is also a multi-tenant architecture having multiple users who co-exist and who can access the same resources in the clusters at the same time.

The cloud environment 110 is provided by a third party distinct from the enterprise environment 101 and may provide data processing through clusters 112 and other services 116 to many different enterprises. The services 116 can include cloud-based enterprise services, e.g., e-mail, calendaring, and conferencing. The enterprise services can also include software-as-a-service applications, e.g., word processing, slide presentations, and spreadsheets, as well as storage for documents generated for each service. Users can assign processing jobs directed to be run on one of the on-premises clusters 102 or 104 or to the cloud clusters 112.

In managing the data processing jobs, it can be valuable to maintain authentication, authorization, and auditing for the processing jobs running on both the on-premises clusters and the cloud clusters. Authentication refers to the process of verifying the identity of a user or a process. It can be important to verify the identity of each user performing processing jobs on both on-premises clusters and cloud clusters. Authorization refers to determining whether a user has permission to perform an action, e.g., determining whether a user has permission to access the data for a processing job on a cluster. Auditing refers to having a log or a trail of actions performed, e.g., for determining which users performed which processing jobs on a cluster, or determining which user accessed which specific pieces of data and when.

On-Premises User Identities

Within an enterprise environment, e.g., the enterprise environment 101, users are typically assigned a unique account used to identify the user and access particular network resources. For example, a user can be assigned an account for a Lightweight Directory Access Protocol (LDAP) that provides directory services allowing for the sharing of various information through the network, e.g., an enterprise intranet.

In some cases, other user identities can be assigned for specific tasks. For example, users that perform data processing tasks using on-premises clusters, e.g., the clusters 102 and 104, can be assigned a Unix account. There is often a one-to-one mapping between the LDAP accounts and the Unix accounts so that the user does not need to log into separate accounts to access the respective functions. In some implementations, users that have finalized particular programming code can move the job to run in a production environment. The processes for the final production jobs can be scheduled to run as a Unix service account that is not associated with any particular individual user identity.

Cloud Identities

An enterprise can also use cloud based services, e.g., the services 116, for example, that provide cloud based e-mail, calendaring, and applications. A separate cloud services account can be assigned to each user for accessing cloud services. For example, an enterprise can use cloud-based e-mail where each user of the enterprise is assigned a cloud services account. This cloud services account can also be given the same account name as the user's LDAP account. However, the passwords are typically different. The account authentication for the cloud services can be managed by the cloud services provider, e.g., a third-party entity. The cloud services account can provide access to all user data stored as part of the cloud services.

The entity providing the cloud-based services can also provide computing clusters for data processing, e.g., the cloud clusters 112.

One option for accessing the data processing jobs executing for the enterprise on the cloud clusters 112 is to use a single service account for the entire enterprise. That is, a single service account can be provisioned to run all data processing jobs of the enterprise on the cloud clusters 112. However, in such a case, auditing can be difficult because there is no direct audit trail of which users are running the data processing jobs; rather, all job requests and data access requests appear to be performed by the one service account. Additionally, since all data has to be accessible by the single service account, authorization can be difficult; that is, it can be difficult to provide different permissions for accessing cloud data to respective different users.

An alternative to using a single service account is to use the individual cloud services accounts that are already assigned to the users. This can provide authentication and auditing of data access in the cloud.

However, when a data processing job runs on a cloud cluster, the job often requires the cloud cluster to access data stored in the cloud. If authentication is required to access the data, then the credentials for access, e.g., the credentials of the cloud services account of the user who launched the data processing job, need to be made available to one or more virtual machines of the cluster performing the data processing job. If the credentials for the cloud services account of the user who launched the data processing job is used for authentication and made available to the virtual machines, then the credentials for the cloud services account might be vulnerable to being stolen, e.g., by an adversary who gains access to the virtual machines or by another user of the virtual machines. For example, any user with administrative access to the virtual machine could obtain the credentials for the cloud services account of a user running a job on the virtual machine, and assume the identity of the cloud service account and have access to all of the cloud services of that user, e.g., the services 116. For example, this could allow the administrative user to view e-mails or documents of the cloud services account.

Identities in a Hybrid on-Premises and Cloud Model

A mirror account can be generated for each user that has a one-to-one mapping with the user's enterprise account, e.g., the user's LDAP account for the enterprise. The mirror account can identify the user associated with the corresponding enterprise account, and can be used to execute jobs launched by the user on the cloud clusters, providing authentication, authorization, and auditing in a multi-tenant hybrid environment of an on-premises and cloud architecture. Additionally, by using mirror accounts separate from cloud services accounts, the security risk of administrative access to the user's cloud services data is reduced.

Figure 2:
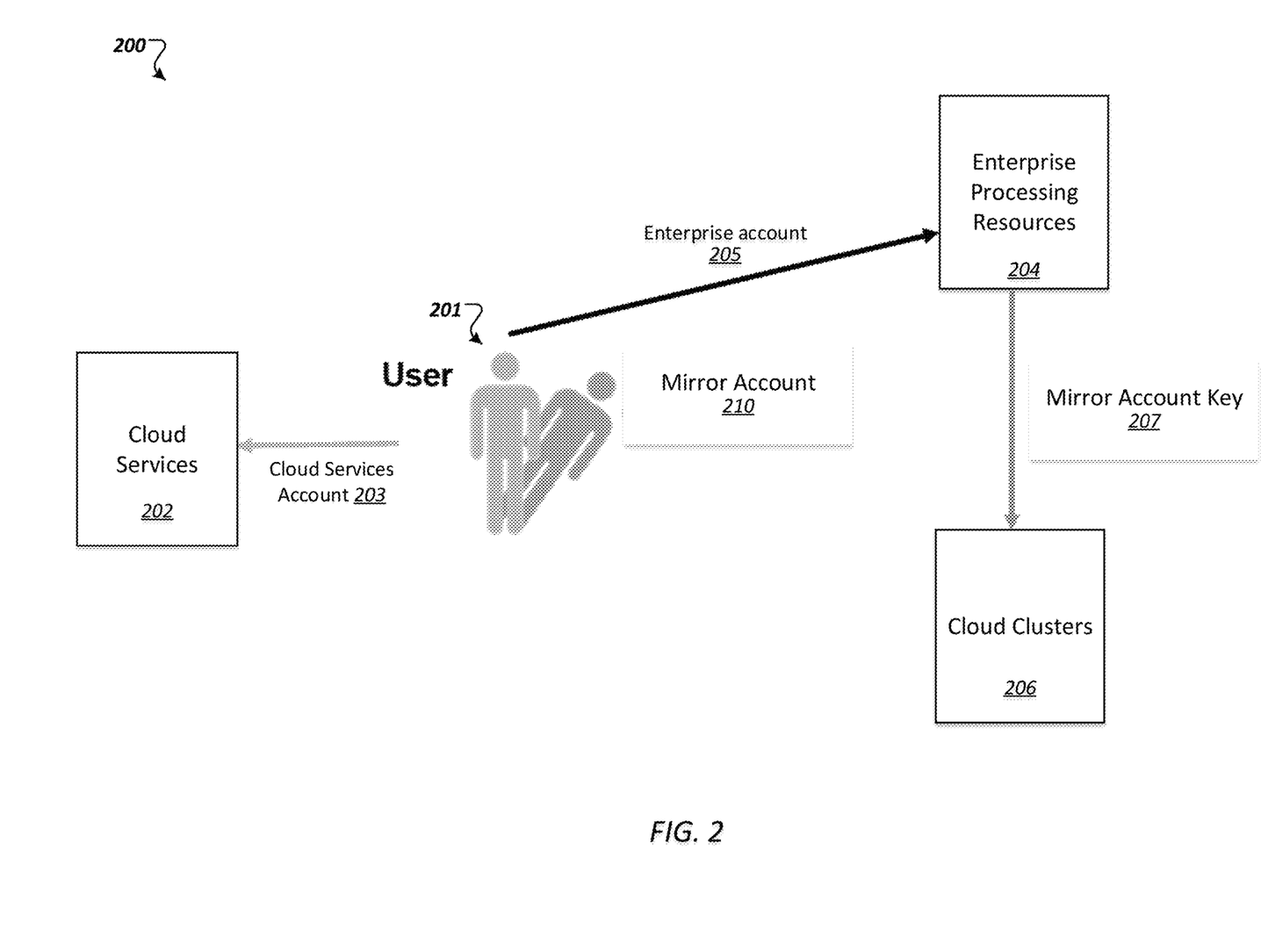
FIG. 2 is a diagram illustrating various user accounts for accessing different services.

FIG. 2 is a diagram 200 illustrating various user accounts of a user 201 for accessing computing resources of an enterprise of the user and for accessing different services of a cloud services provider of the enterprise. The user 201 accesses cloud services 202 using a cloud services account 203. The user 201 also accesses enterprise processing resources 204 of the enterprise, e.g., processing resources that include one or more on-premises clusters, using an enterprise account 205, e.g., a Unix or other suitable account. As noted above, the cloud services account 203 and the enterprise account 205 may have the same account name; however, the account authentication for the cloud services account 203 is managed by the cloud services provider, while the account authentication for the enterprise account 205 can be managed by the enterprise. A data processing request from the user 201 and directed to the enterprise processing resources 204 can be run on an on-premises cluster using the enterprise account credentials 205 or can be run on cloud clusters 206.

The cloud services provider can generate a mirror account 210 for the user 201 that provides access to particular cloud data for data processing jobs performed by the cloud clusters 206. In some implementations the enterprise processing resources 204 can generate the mirror account 210. This mirror account can map to the corresponding enterprise account 205 of the user.

When the enterprise processing resources 204 receive a request to launch a data processing job of the user 201, the enterprise processing resources 204 can determine whether the data processing job should be executed on on-premises clusters, or on the cloud clusters 206. In some implementations, the request for launching the data processing job submitted by the user 201 will identify which type of cluster should execute the job; in some other implementations, the enterprise processing resource 204 can make the determination without user input, e.g., according to the availability of the on-premises clusters. If the enterprise processing resources 204 determine to execute the data processing job using on-premises clusters, then the enterprise processing resources can authorize and audit the job using the enterprise account 205. If the enterprise processing resources 204 determine to execute the data processing job using the cloud clusters 206, then the enterprise processing resources 204 can route the job request to the cloud clusters 206 using the mirror account 210. The requests sent by the enterprise processing resources 204 to the cloud clusters 206 can be authenticated using a password represented in FIG. 2 by a key 207 of the mirror account 210, e.g., a JSON key.

The cloud clusters 205 can then authorize and audit the data processing job using the mirror account 210. For example, the cloud clusters 206 can generate logs of the requests for cloud data submitted by the data processing job, and associate the logs with the user 201 associated with the mirror account 210. The cloud clusters 206 can also determine, for each request for cloud data submitted by the data processing job, whether the user 201 has access to the cloud data being requested. In particular, the cloud clusters 206, and any other users of the cloud clusters 206, e.g., an administrative user of the cloud clusters 206, cannot use the mirror account 210 to access the cloud services 202 of the user 201, ensuring that the user data of the cloud services 202 is secure even if credentials for the mirror account 210 is obtained by another user of the cloud clusters 206.

The cloud services provider can generate the mirror account 210 in a manner that is transparent to the user 201. The user 201 does not need to know about the details of the mirror account 210 or the account credentials of the mirror account 210. Additionally, the passwords for the mirror account 210, e.g., the key 201, can be generated and periodically rotated by the system, e.g., by the enterprise processing resources 204 or the cloud clusters 206. As a result, the individual users do not need to know the credentials of their respective mirror account or enter the credentials to perform data processing. The users also do not need to know that it is the mirror account that is the identity accessing the data on the cloud when running their data processing jobs. Data characterizing the mirror accounts of the enterprise, and the credentials for the mirror accounts, can be stored on-premises by the enterprise processing resources 204.

Figure 3:
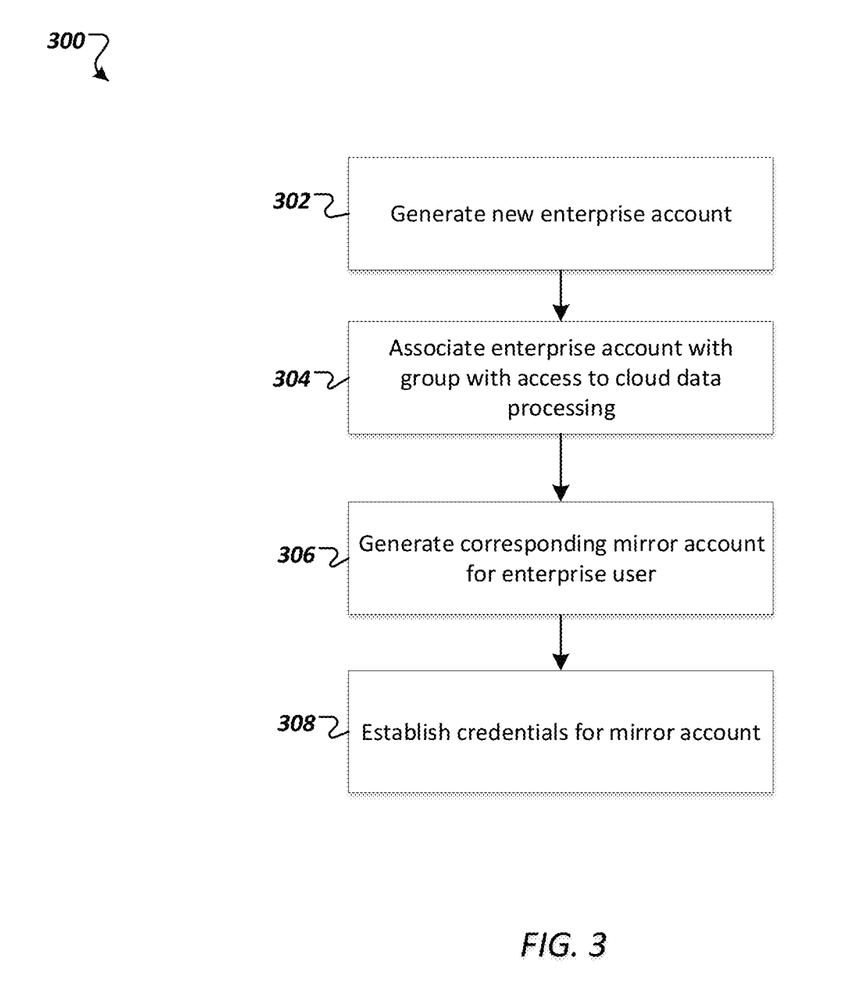
FIG. 3 is a flow diagram of an example process for credentialing a new user.

FIG. 3 is a flowchart of an example process 300 for generating credentials for a new user of an enterprise. For convenience, the process 300 will be described as being performed by a system of one or more computers, located in one or more locations, and programmed appropriately in accordance with this specification.

The system generates an account identifier for the user (302). For example, the account identifier can be for a new enterprise account of the user. The enterprise account can be a new account generated when the user joins the enterprise, for example, an LDAP account having a unique account name, e.g., newuser1. A corresponding cloud services account can be generated at the same time for accessing cloud-hosted services of the enterprise, e.g., e-mail, provided by a cloud services provider. The cloud services account can, for convenience, be generated with the same account name, e.g., newuser1, but will generally have a different password than the enterprise account.

The system associates the enterprise account with a group of users of the enterprise having access cloud data processing (304). For example, the system can associate the user's enterprise account with particular organizational groups of the enterprise based on the user's role in the enterprise. These organization groups can each work with, and have access to, different portions of enterprise data stored or processed in cloud clusters of the cloud services provider.

The system can determine whether the enterprise account has a mirror account associate with it. In response to determining that the enterprise account does not have a corresponding mirror account, the system generates a mirror account for the user (306). The mirror account can be used by on-premises computing resources of the enterprise to launch computing jobs of the user onto the cloud clusters of the cloud services provider. The mirror account can be constructed in a way that readily identifies the corresponding enterprise account. For example, the account name of the enterprise account can be included within the mirror account, e.g., newuser1@enterprisegrp.iam.mirroraccount.com. By including the enterprise account in the mirror account, auditing can quickly be performed in order to map requests for cloud cluster data to enterprise accounts associated with the data access requests.

The system establishes credentials for the mirror account of the user (308). The credentials can include a particular set of permissions defining the cloud data that the user account is permitted access. The system can establish the credentials for the mirror account of the user according to the different enterprise groups with which the enterprise account of the user is associated. Thus, the mirror account of each user can be given credentials tailored to the particular groups of which the user is a member, based on the types of data processing jobs that members of the particular groups are allowed to perform.

The system can also specify a user storage area for storing data associated with the cloud processing jobs of the user separately from data of other users.

The system generates one or more keys for the mirror account. The keys are stored by the enterprise, e.g., in a secure key store of the enterprise processing resources, and retrieved when a user data processing job is sent to the cloud clusters. The keys are stored such that they can only be retrieved in association with the particular mirror account.

Importantly, the mirror account does not have access to the cloud services provided by the cloud services provider that are not related to the cloud clusters and the launched data processing job. That is, the mirror account cannot access the cloud services of the user that the user can access using the generated cloud services account of the user. Thus, even if the mirror account is compromised, the user data maintained by these other cloud services remains secure.

Figure 4:
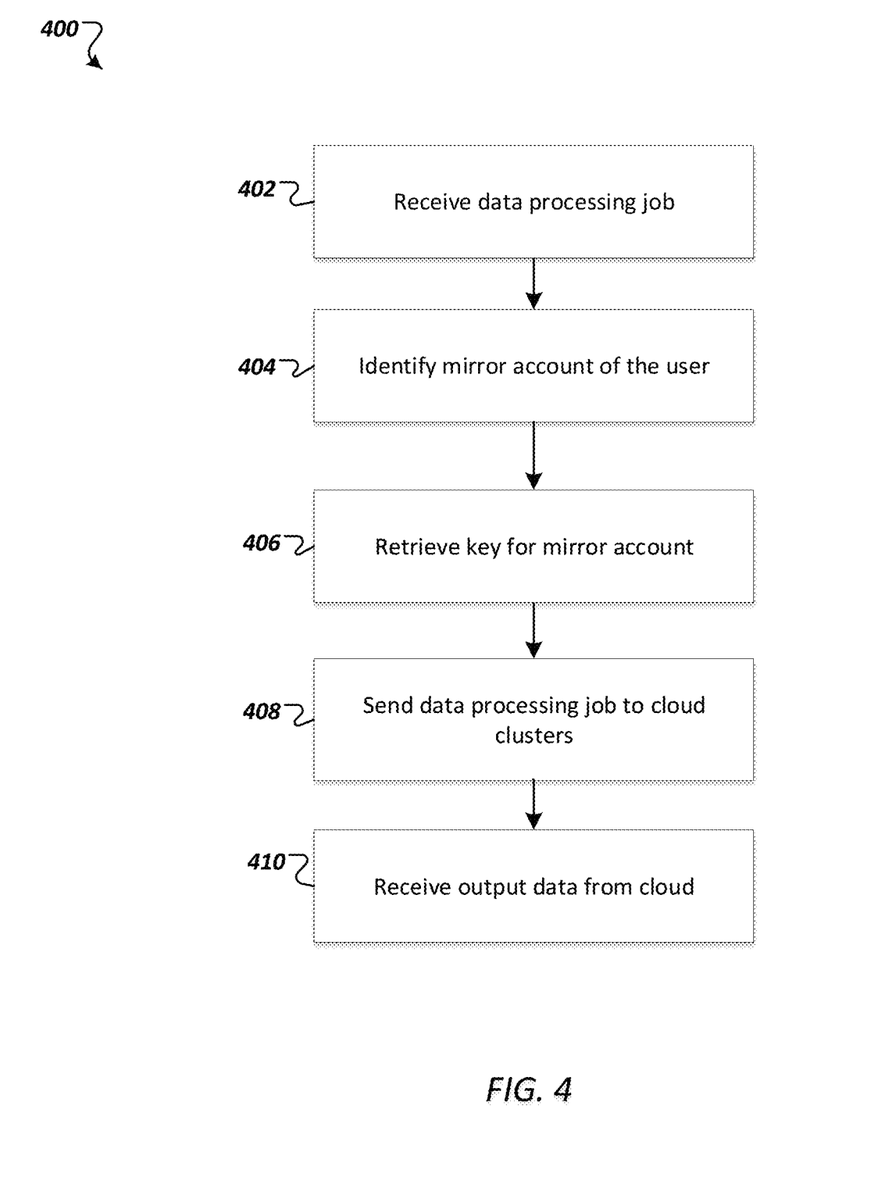
FIG. 4 is a flow diagram of an example process for initiating a data process job using a mirror account.

FIG. 4 is a flowchart of an example process 400 for initiating a data processing job using a mirror account. For convenience, the process 400 will be described as being performed by a system of one or more computers, located in one or more locations, and programmed appropriately in accordance with this specification.

The system receives a data processing job from a user of an enterprise (402). For example, the user can submit the job to a data processing management system of the enterprise that manages data processing jobs, for example, by scheduling a portion of the possessing jobs to be performed by on-premises clusters and by providing a different portion of the processing jobs to cloud clusters of a cloud services provider. In some implementations, the user request specifies whether the data processing job should be executed on an on-premises cluster or on a cloud cluster. In some other implementations, the data processing management system determines where to send the data processing job based on the resources needed to perform the job.

For a job to be performed by cloud clusters, the system identifies a mirror account of the requesting user (404). The mirror account can be identified based on the enterprise account name of the user. In particular, as described above, the mirror account can be generated for the user that includes the enterprise account name in the name of the mirror account. In some other implementations, the system looks up the mirror account of the user in a directory that associates enterprise account names (or Unix account names for on-premises data processing) with mirror accounts.

The system retrieves a current key for the mirror account (406). The key is a password for the mirror account to provide authentication to the cloud clusters and can be stored by the system in a secure key store. Thus, the system can retrieve the key rather than request user password input. The key for the mirror account can be periodically changed to enhance the security of the mirror account. In some implementations, a set of keys are rotated periodically, e.g., a particular number of days. That is, new keys can be periodically generated and the oldest phased out.

The system sends the data processing job to the cloud clusters using the mirror account identifier and key (408). The mirror account identifier provides information allowing the cloud clusters to determine whether the account is authorized to access the data for the job. The key provides authentication of the mirror account.

If the user is properly authorized and authenticated, the cloud clusters perform the data processing job. The system receives output data from the cloud cluster (410). The output data can depend on the particular data processing job performed by the cloud cluster.

Embodiments of the subject matter include methods and corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising: receiving a data processing job associated with a user account of a user; determining to launch the data processing job on one or more cloud clusters of a cloud services provider; identifying a mirror account corresponding to the user, wherein the mirror account defines which cloud resources of the cloud services provider the user is permitted to access; obtaining a key for the mirror account; sending a request to launch the data processing job on the one or more cloud clusters, comprising sending data characterizing the data processing job, the mirror account of the user, and the obtained key to the one or more cloud clusters, wherein the obtained key authenticates the request with the one or more cloud clusters; and receiving output data associated with the data processing job from the one or more cloud clusters.

Embodiment 2 is the method of embodiment 1, wherein the one or more cloud clusters use the mirror account to authorize one or more requests submitted by the data processing job, the authorizing comprising determining whether the user is permitted to access data associated with the requests.

Embodiment 3 is the method of any one of embodiments 1 or 2, wherein the one or more cloud clusters use the mirror account to audit one or more requests submitted by the data processing job, the auditing comprising generating one or more logs associated with the requests and with the user.

Embodiment 4 is the method of any one of embodiments 1-3, wherein the cloud services provider provides one or more other cloud services to the user, and wherein the mirror account does not have access to data associated with the one or more other cloud services.

Embodiment 5 is the method of any one of embodiments 1-4, wherein obtaining the key for the mirror account comprises obtaining the key from a secure key store, and wherein the key is updated periodically.

Embodiment 6 is the method of any one of embodiments 1-5, wherein determining to launch the data processing job on the one or more cloud clusters comprises identifying a user input associated with the data processing job, wherein the user input specifies that the data processing job should be launched on the one or more cloud clusters.

Embodiment 7, is the method of any one of embodiments 1-6, wherein determining to launch the data processing job on the one or more cloud clusters comprises determining an ability of one or more on-premises clusters of an enterprise of the user to execute the data processing job.

Embodiment 8 is the method of any one of embodiments 1-7, further comprising: receiving a second data processing job associated with a second user account of a second user; determining to launch the data processing job on one or more on-premises clusters of an enterprise of the user; and executing the data processing job on the one or more on-premises clusters using credentials associated with the second account.

Embodiment 9 is a method comprising: generating an account identifier for a user; associating the account identifier with one or more groups of users authorized to perform data processing on one or more cloud clusters; generating a corresponding mirror account for the account identifier, wherein the mirror account can be used to perform data processing jobs for the user on the one or more cloud clusters; and establishing credentials for the mirror account, comprising: defining access permissions to data stored on the one or more cloud clusters according to the one or more groups of users, and generating one or more passwords for the mirror account.

Embodiment 10 is the method of embodiment 9, wherein the mirror account and the one or more passwords for the mirror account are transparent to the user.

Embodiment 11 is the method of any one of embodiments 9 or 10, wherein the account identifier corresponds to an enterprise account of the user for an enterprise, and wherein the enterprise account of the user can be used to perform data processing jobs for the user on one or more on-premises clusters of the enterprise.

Embodiment 12 is the method of any one of embodiments 9-11, further comprising: generating a cloud services account for the user, wherein the cloud services account corresponds to one or more cloud services provided by a cloud services provider of the one or more cloud clusters; and establishing credentials for the cloud services account, wherein the credentials for the mirror account and the credentials for the cloud services account are different.

Embodiment 13 is the method of embodiment 12, wherein the access permissions corresponding to the mirror account do not provide access to the one or more cloud services provided by the cloud services provider.

Embodiment 14 is the method of any one of embodiments 9-13, further comprising: storing the one or more passwords for the mirror account in a secure data store; and periodically updating the one or more passwords for the mirror account.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a data processing job associated with a user account of a user, wherein the user account is used to authenticate requests for accessing resources of an enterprise environment;
   determining to launch the data processing job on one or more cloud clusters of a cloud services provider, wherein a cloud services account of the user is used to authenticate requests for accessing a first set of resources of the cloud services provider;
   identifying a mirror account corresponding to the user account of the user, wherein:
      the mirror account of the user is used to authenticate requests for accessing a second set of resources of the cloud services provider, and
      the mirror account is distinct from the user account and the cloud services account;
   obtaining a key for the mirror account;
   sending a request to launch the data processing job on the one or more cloud clusters, comprising sending data characterizing the data processing job, the mirror account of the user, and the obtained key to the one or more cloud clusters, wherein the obtained key authenticates the request with the one or more cloud clusters; and
   receiving output data associated with the data processing job from the one or more cloud clusters.

2. The method of claim 1, wherein the one or more cloud clusters use the mirror account to authorize one or more requests submitted by the data processing job, the one or more requests being associated with at least a subset of the second set of resources of the cloud services provider, the authorizing comprising determining whether the user is permitted to access the subject.

3. The method of claim 1, wherein the one or more cloud clusters use the mirror account to audit one or more requests submitted by the data processing job, the auditing comprising generating one or more logs associated with the requests and with the user.

4. The method of claim 1, wherein obtaining the key for the mirror account comprises obtaining the key from a secure key store, and wherein the key is updated periodically.

5. The method of claim 1, wherein determining to launch the data processing job on the one or more cloud clusters comprises identifying a user input associated with the data processing job, wherein the user input specifies that the data processing job should be launched on the one or more cloud clusters.

6. The method of claim 1, wherein determining to launch the data processing job on the one or more cloud clusters comprises determining an ability of one or more clusters of the enterprise environment to execute the data processing job.

7. The method of claim 1, further comprising:
   receiving a second data processing job associated with a second user account of a second user;
   determining to launch the data processing job on one or more clusters of the enterprise environment; and
   executing the data processing job on the one or more clusters of the enterprise environment using the second user account.

8. The method of claim 1, further comprising:
   generating, by the one or more cloud clusters of the cloud services provider or by one or more processing resources of the enterprise environment, the mirror account for the user.

9. A system comprising:
   an enterprise environment comprising one or more data centers, each data center having one or more data processing clusters; and
   a multi-tenant cloud environment comprising one or more cloud-based data processing clusters and one or more cloud-based services,
   wherein each data processing cluster of the enterprise environment is configured to perform operations comprising:
      receiving a data processing job associated with a user account of a user, wherein the user account is used to authenticate requests for accessing resources of the enterprise environment;
      determining to launch the data processing job on the one or more cloud-based data processing clusters of the multi-tenant cloud environment, wherein a cloud services account of the user is used to authenticate requests for accessing a first set of resources of the multi-tenant cloud environment;

identifying a mirror account corresponding to the user account of the user, wherein:
the mirror account of the user is used to authenticate requests for accessing a second set of resources of the multi-tenant cloud environment, and
the mirror account is distinct from the user account and the cloud services account;

obtaining a key for the mirror account;

sending a request to launch the data processing job on the one or more cloud-based data processing clusters, comprising sending data characterizing the data processing job, the mirror account of the user, and the obtained key to the one or more cloud-based data processing clusters, wherein the obtained key authenticates the request with the one or more cloud-based data processing clusters; and receiving output data associated with the data processing job from the one or more cloud-based data processing clusters.

10. The system of claim 9, wherein the one or more cloud-based data processing clusters use the mirror account to authorize one or more requests submitted by the data processing job, the one or more requests being associated with at least a subset of the second set of resources of the multi-tenant cloud environment, the authorizing comprising determining whether the user is permitted to access the subset.

11. The system of claim 9, wherein the one or more cloud-based data processing clusters use the mirror account to audit one or more requests submitted by the data processing job, the auditing comprising generating one or more logs associated with the requests and with the user.

12. The system of claim 9, wherein obtaining the key for the mirror account comprises obtaining the key from a secure key store, and wherein the key is updated periodically.

13. The system of claim 9, wherein determining to launch the data processing job on the one or more cloud-based data processing clusters comprises identifying a user input associated with the data processing job, wherein the user input specifies that the data processing job should be launched on the one or more cloud-based data processing clusters.

14. The system of claim 9, wherein determining to launch the data processing job on the one or more cloud-based data processing clusters comprises determining an ability of the data centers of the enterprise environment to execute the data processing job.

15. The system of claim 9, wherein each data processing cluster of the enterprise environment is configured to perform operations further comprising:
receiving a second data processing job associated with a second user account of a second user;
determining to launch the data processing job on one or more particular data processing clusters of a particular data center of the enterprise environment; and
executing the data processing job on the one or more particular data processing clusters of the particular data center of the enterprise environment using the second user account.

16. The system of claim 9, wherein each data processing cluster of the enterprise environment is configured to perform operations further comprising:
generating, by the one or more cloud-based data processing clusters of the multi-tenant cloud environment or by the one or more data processing clusters of a respective data center of the enterprise environment, the mirror account for the user.

17. One or more non-transitory computer storage media encoded with computer program instructions that when executed by one or more computers cause the one or more computers to perform operations comprising:
receiving a data processing job associated with a user account of a user, wherein the user account is used to authenticate requests for accessing resources of an enterprise environment;
determining to launch the data processing job on one or more cloud clusters of a cloud services provider, wherein a cloud services account of the user is used to authenticate requests for accessing a first set of resources of the cloud services provider;
identifying a mirror account corresponding to the user account of the user, wherein:
the mirror account of the user is used to authenticate requests for accessing a second set of resources of the cloud services provider, and
the mirror account is distinct from the user account and the cloud services account;
obtaining a key for the mirror account;
sending a request to launch the data processing job on the one or more cloud clusters, comprising sending data characterizing the data processing job, the mirror account of the user, and the obtained key to the one or more cloud clusters, wherein the obtained key authenticates the request with the one or more cloud clusters; and
receiving output data associated with the data processing job from the one or more cloud clusters.

18. The one or more non-transitory computer storage media of claim 17, wherein the one or more cloud clusters use the mirror account to authorize one or more requests submitted by the data processing job, the one or more requests being associated with at least a subset of the second set of resources cloud services provider, the authorizing comprising determining whether the user is permitted to access the subset.

19. The one or more non-transitory computer storage media of claim 17, wherein the one or more cloud clusters use the mirror account to audit one or more requests submitted by the data processing job, the auditing comprising generating one or more logs associated with the requests and with the user.

20. The one or more non-transitory computer storage media of claim 17, wherein obtaining the key for the mirror account comprises obtaining the key from a secure key store, and wherein the key is updated periodically.

21. The one or more non-transitory computer storage media of claim 17, wherein determining to launch the data processing job on the one or more cloud clusters comprises identifying a user input associated with the data processing job, wherein the user input specifies that the data processing job should be launched on the one or more cloud clusters.

22. The one or more non-transitory computer storage media of claim 17, wherein determining to launch the data processing job on the one or more cloud clusters comprises determining an ability of one or more clusters of the enterprise environment to execute the data processing job.

23. The one or more non-transitory computer storage media of claim 17, wherein the operations further comprise:
receiving a second data processing job associated with a second user account of a second user;

determining to launch the data processing job on one or more clusters of the enterprise environment; and executing the data processing job on the one or more clusters of the enterprise environment using the second user account.

24. The one or more non-transitory computer storage media of claim 17, wherein the operations further comprise:

generating, by the one or more cloud clusters of the cloud services provider or by one or more processing resources of the enterprise environment, the mirror account for the user.

\* \* \* \* \*